United States Patent [19]

Johansson

[11] Patent Number: 5,069,864

[45] Date of Patent: Dec. 3, 1991

[54] NUCLEAR FUEL ASSEMBLY SPACER AND SPRING

[75] Inventor: Eric B. Johansson, San Jose, Calif.

[73] Assignee: General Electric Company, San Jose, Calif.

[21] Appl. No.: 509,457

[22] Filed: Apr. 16, 1990

[51] Int. Cl.⁵ .............................................. G21C 3/34
[52] U.S. Cl. .................................... 376/441; 376/438; 376/442
[58] Field of Search ........................ 376/438, 441, 442

[56] References Cited

U.S. PATENT DOCUMENTS

| | | | |
|---|---|---|---|
| 4,508,679 | 4/1985 | Matzner et al. | 326/438 |
| 4,544,522 | 10/1985 | Curulla | 376/441 |
| 4,571,324 | 2/1986 | Johansson | 376/441 |
| 4,587,704 | 5/1986 | Matzner et al. | 29/446 |
| 4,913,875 | 4/1990 | Johansson | 376/439 |
| 5,002,726 | 3/1991 | Johansson | 376/448 |

FOREIGN PATENT DOCUMENTS 63-48031  9/1988  Japan .

*Primary Examiner*—Donald P. Walsh
*Attorney, Agent, or Firm*—Robert R. Schroeder

[57] ABSTRACT

A spring-and-spacer assembly for maintaining fuel rods in a upright preferred position in a fuel assembly of a nuclear reactor core is provided. The spring has a leg portion and two loop portions, one at each end of the leg. Each loop engages an ear formed in a ferrule of the spacer. Each loop contains a dimple which contacts an ear of the ferrule. The central leg portion has a dimple, or a projection, which contacts a fuel rod and biases the fuel rod against stops. The spring load is transmitted to the ferrule ears by the dimples in the spring loops. Preferably, the spring rotates about the dimple when flexed, contributing to spring flexibility. The high spring flexibility permits use of the spring in connection with small rod-to-rod spacing fuel assemblies. This construction permits providing a low-mass, low-surface area spring, in turn providing for low neutron absorption and low flow obstruction.

20 Claims, 7 Drawing Sheets

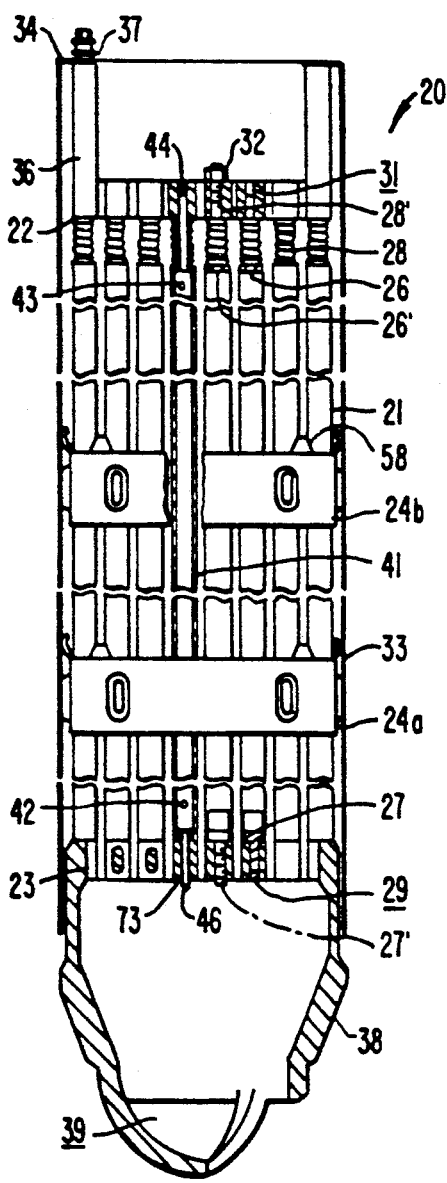
FIG._1.
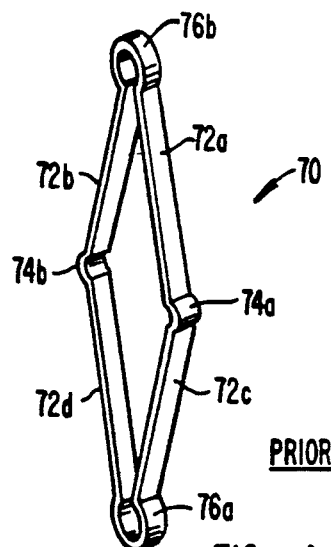
FIG._4. PRIOR ART
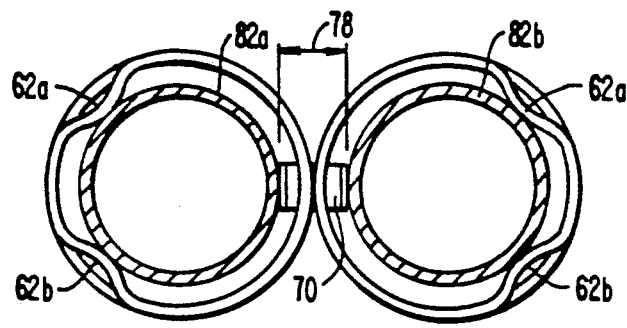
FIG._5. PRIOR ART
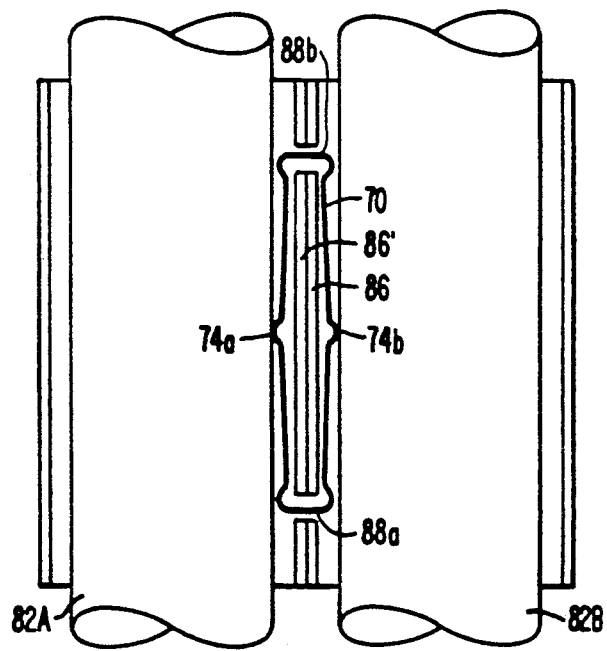
FIG._6. PRIOR ART

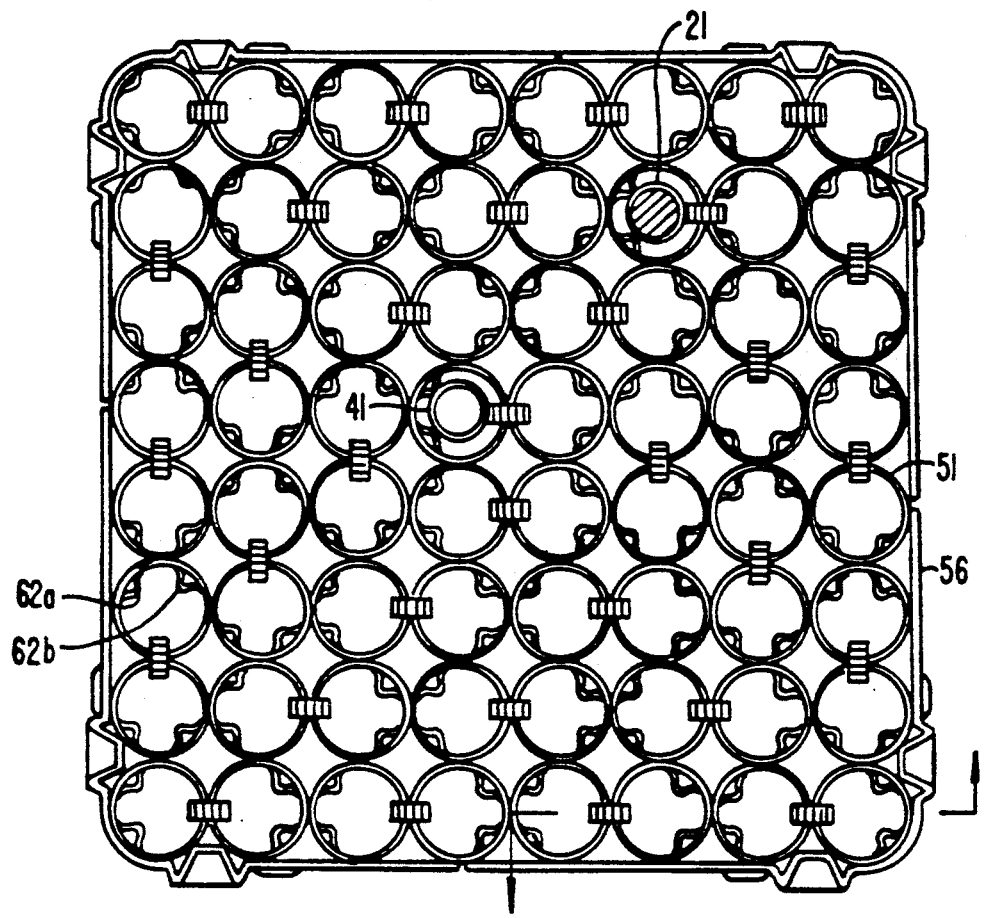
FIG._2.   PRIOR ART
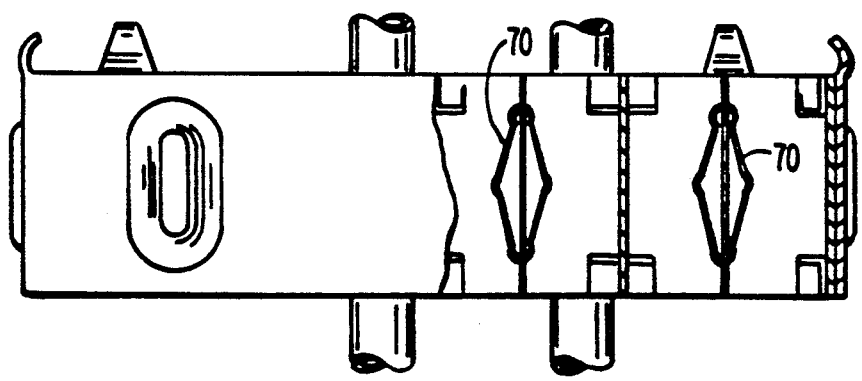
FIG._3.   PRIOR ART

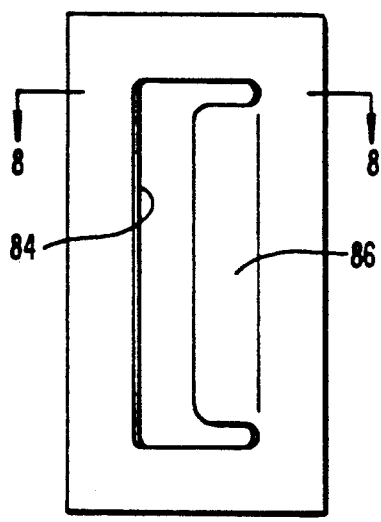
FIG._7.
PRIOR ART
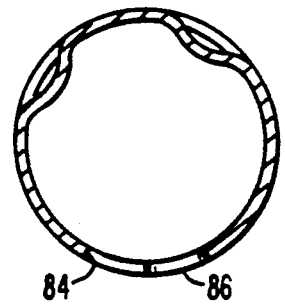
FIG._8.
PRIOR ART
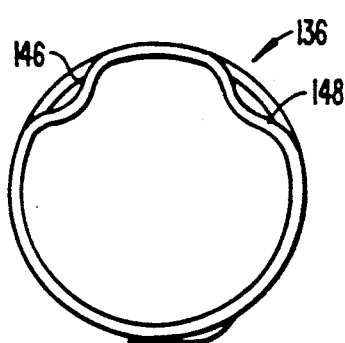
FIG._11.
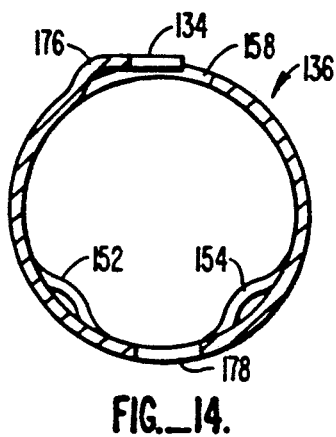
FIG._14.
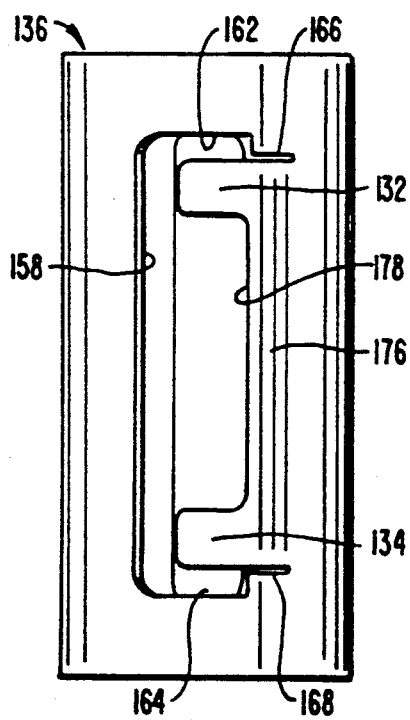
FIG._12.
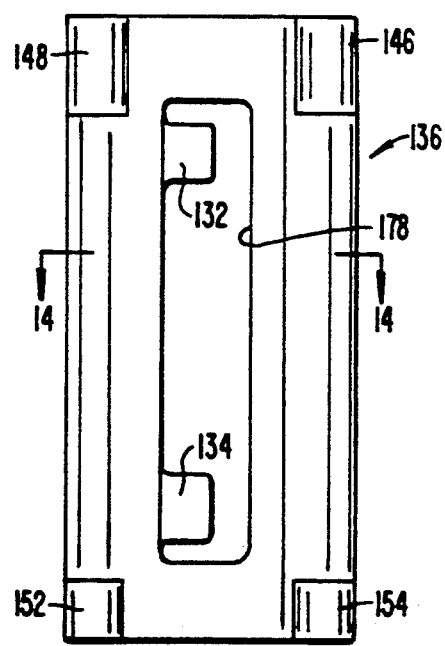
FIG._13.

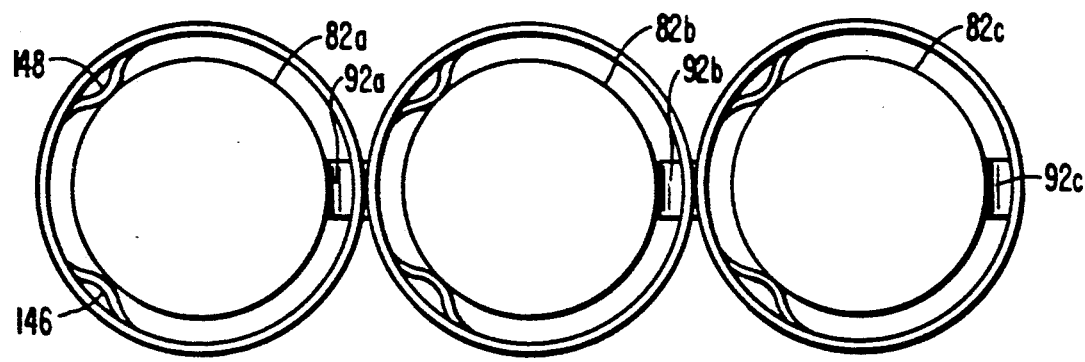
FIG._9.
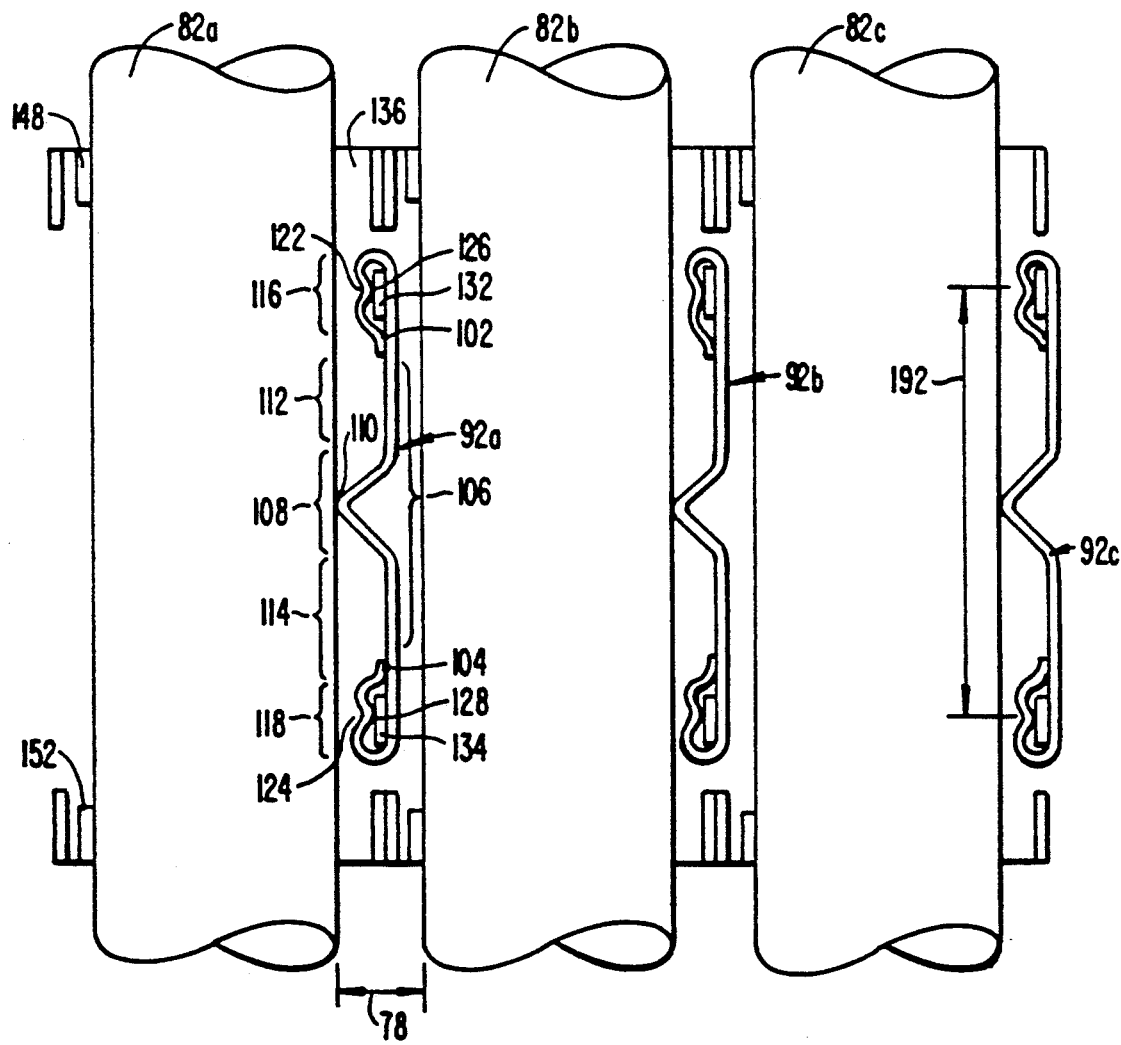
FIG._10.

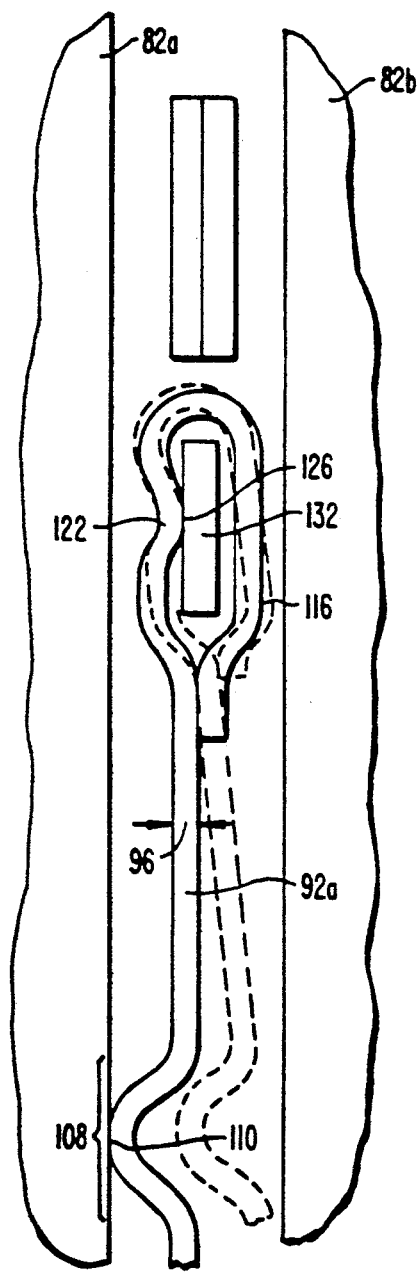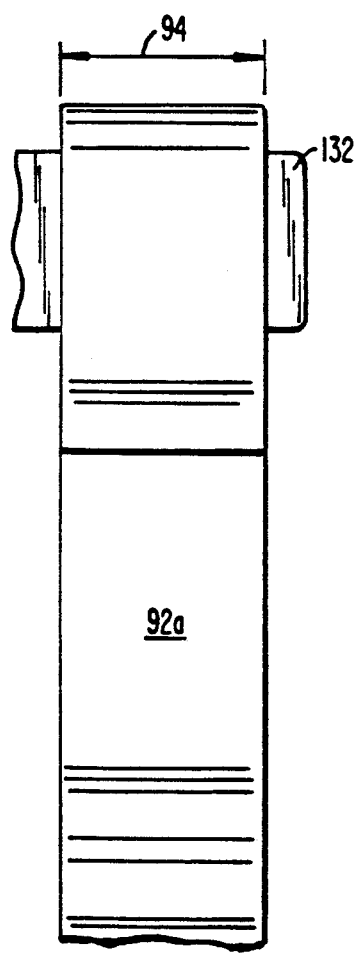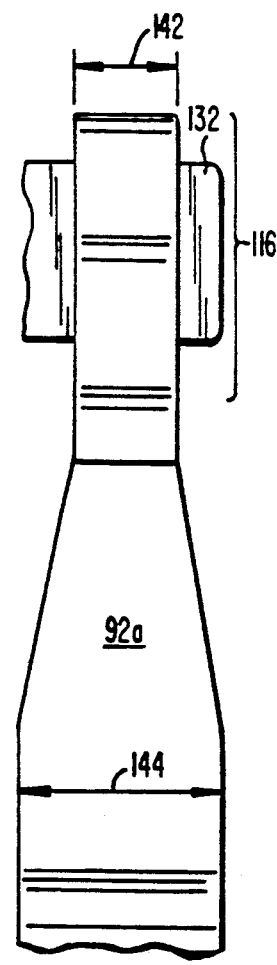
FIG._15.   FIG._16.   FIG._17.

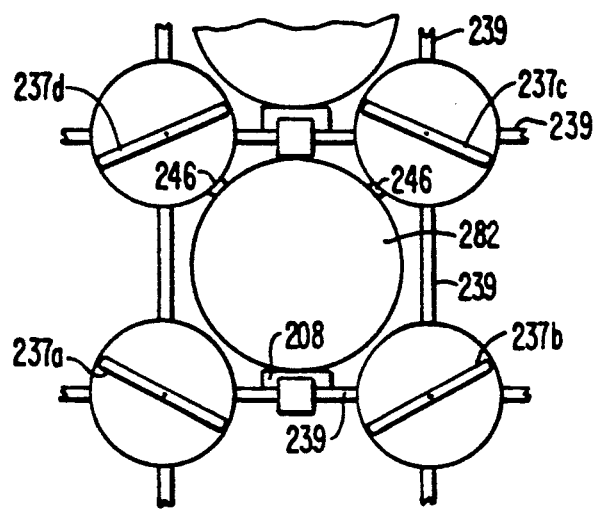
FIG._18.
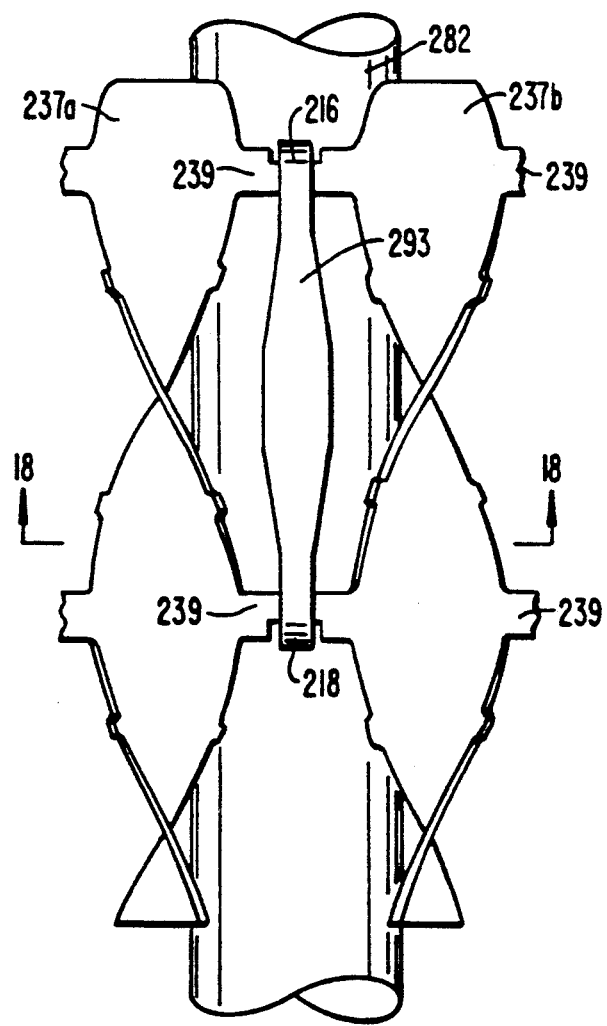
FIG._19.

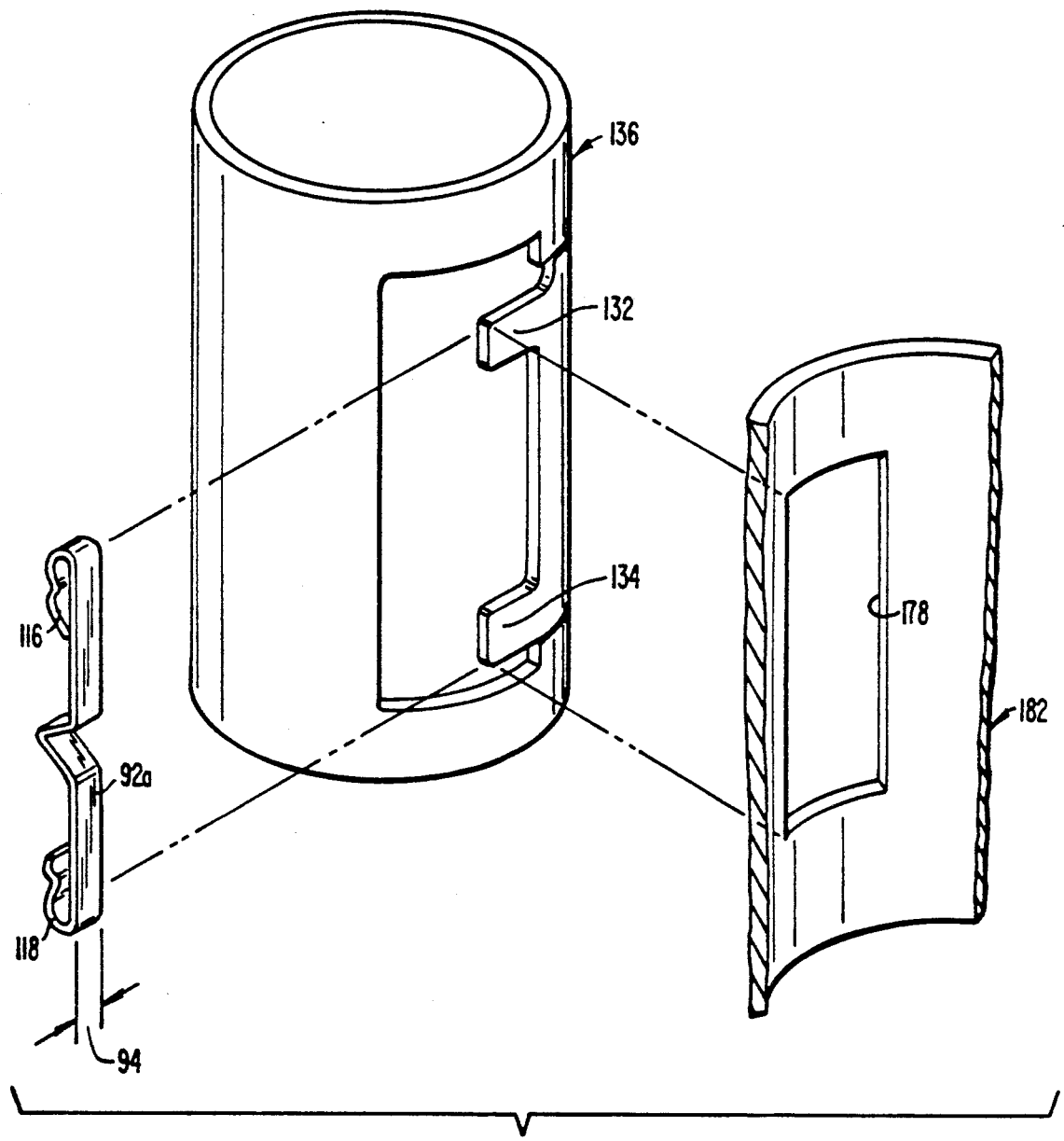
FIG._20.

NUCLEAR FUEL ASSEMBLY SPACER AND SPRING

FIELD OF THE INVENTION

The present invention relates to a spacer usable for positioning fuel rods in a nuclear fuel assembly and springs therefor, and, in particular, to a spacer with a spring for biasing a fuel rod against a portion of the spacer in which the spring occupies reduced space.

BACKGROUND OF THE INVENTION

In a known type of nuclear power reactor, for example, a boiling-water reactor, nuclear fuel is provided in the shape of elongated rods. The nuclear fuel is typically in the form of uranium and/or plutonium oxide pellets enclosed in zircaloy tubes. A number of such fuel rods are grouped together in an open-ended tubular flow channel. The flow channel with the fuel rods positioned therein is referred to as a "fuel assembly" or "bundle." A plurality of fuel assemblies are removably positioned in the reactor core in a matrix. The reactor core formed in this manner is capable of self-sustained fission reaction. The core is submerged in a fluid, such as light water, which serves both as a coolant and as a neutron moderator.

The fuel rods in a fuel assembly are supported between upper and lower tie plates. The fluid coolant flows past the fuel rods in the inter-rod spaces. To provide proper coolant flow and preserve integrity of the fuel rods, it is important to maintain the rods in a preferred spaced relationship and to restrain them from bowing and vibrating during reactor operation.

To maintain uniform spacing, a plurality of fuel rod spacers spaced along the length of the fuel assembly are provided for this purpose. Typically, a spacer includes a plurality of generally cylindrical ferrule elements. An example of a spacer usable in a fuel assembly is that shown in U.S. Pat. No. 4,508,679, issued Apr. 2, 1989, to Matzner, et al. As shown in Matzner, et al., one method of positioning a fuel rod within the ferrule elements of a spacer is to provide a spring member for biasing the fuel rod against rigid stops in the ferrules. The spring depicted in U.S. Pat. No. 4,508,679 is in the form of a continuous loop of generally elliptical shape. The springs are positioned in the area between rods.

Previous fuel assemblies had been constructed with rod-to-rod spacings (i.e., distances between outer circumferences of adjacent rods) of about 0.125 inches to about 0.160 inches (about 3 mm to about 4 mm). Modern fuel bundles are being designed to have a reduced rod-to-rod spacing, such as less than about 0.11 inches (about 2.8 mm), preferably about 0.1 inches (about 2.5 mm). Such spacings are encountered in modern fuel rod arrays having matrix densities of 9 by 9 or higher.

The length and width of the springs is also limited by the spacer design. The spring length must be less than the spacer height in order that the spring can be captured in the spacer. If the spacer height is increased, the pressure drop through the spacer is increased. If the spring width is increased, the spring will block more flow area and cause an increased pressure drop.

A nominal spring force of about 2.5 pounds is required. During assembly and shipping, deflections greater than the nominal deflection can be imposed. In addition, dimensional variations from the nominal values can impose increased deflections. The spring must be able to absorb these additional deflections without suffering permanent deflection.

In summary, the spring should provide a given nominal force and be able to absorb deflection beyond the nominal value, while fitting into a small space. The spring disclosed here provides the required nominal force and has a greater deflection before the onset of permanent deflection than the loop spring, under the design constraints described above.

SUMMARY OF THE INVENTION

A spring for attachment to a spacer is disclosed in which the spring is formed of a single spring leg. The single spring leg is bent to an upper loop for surrounding a first ferrule portion for support from the spacer at the upper end. Likewise the single spring leg is bent to a lower loop for surrounding a second ferrule portion for support from the spacer at the lower end.

The single spring leg defines in the central portion a convex and arcuate contact point for contacting and biasing a fuel rod relative to the spacer.

The upper and lower loops as supported from the ferrule are provided with point supports to the ferrule at the inside of each loop. The loops bear against the spacer at these support points in opposition to the force of the spring on the fuel rod. The loops, however, are free to rotate relative to these support points when the spring leg undergoes a bending moment. Simply stated, there is a simple beam support at each end of the spring.

In contrast, the upper and lower ends of the prior art loop spring cannot rotate. For the same length, the loop spring is much stiffer than the spring disclosed.

The spring provides a force to the fuel rod of between about one pound and about four pounds (about 0.5 kg to about 2 kg), preferably about 2.5 pounds (about 1 kg), yet is contained between rods having a rod-to-rod spacing of only about 0.1 inches (about 2.5 mm).

The springs are distributed with one spring for each fuel rod. Each spring is mounted on an ear formed by a slot in the ferrule wall. A differently shaped slot in an adjacent ferrule locks the spring and prevents its sliding off of the ears.

The loop springs of the prior art have a uniform width over the entire spring. A more efficient spring can be designed using a non-uniform width. However a loop spring with non-uniform width is very difficult to manufacture and would be very expensive. The springs disclosed herein would be manufactured by starting with a flat strip and stamping the desired variation in width. The resulting strip is then bent into the desired shape.

A reduced width near the ends of the spring minimizes blockage of flow by the spring and neutron capture by the spring.

In other embodiments, the spring is used in connection with a swirl vane spacer.

The spring can accommodate excess deflection without becoming deformed, permitting assembly with a plastic sheath over the fuel rods to prevent scratching the exterior of the fuel rod cladding.

BRIEF DESCRIPTION OF THE DRAWINGS

FIG. 1 is a broken-away partial elevational view, partly in section, of a nuclear fuel bundle;

FIG. 2 is a plan view of a previous fuel rod spacer;

FIG. 3 is an elevation view, partly in section, of the spacer of FIG. 2;

FIG. 4 is a perspective view of a loop spring provided in previous devices;

FIG. 5 is a top plan view of two adjacent ferrules and an intervening spring of previous devices;

FIG. 6 is a front elevational view of the ferrules of FIG. 5, partly in cross-section;

FIG. 7 is an elevational view of a ferrule provided in previous devices;

FIG. 8 is a cross-sectional view of a ferrule taken along line 8—8 of FIG. 7;

FIG. 9 is a top plan view of three adjacent ferrules and associated springs according to the present invention;

FIG. 10 is an elevational view, partly in cross section, of the ferrules and springs of FIG. 9;

FIG. 11 is a top plan view of a ferrule usable in connection with the present invention;

FIG. 12 is an elevational view of the ferrule of FIG. 11;

FIG. 13 is an elevational view of a ferrule according to the present invention;

FIG. 14 is a cross-sectional view taken along line 14—14 of FIG. 13;

FIG. 15 is a detail of the loop portion of a spring according to the present invention with an exaggerated rotated configuration of the spring shown in phantom lines;

FIG. 16 is a side plan view of the spring detail of FIG. 15;

FIG. 17 depicts an alternative embodiment in a view corresponding generally to the view of FIG. 16;

FIG. 18 is a partial top plan view of a swirl vane spacer usable in connection with the present invention;

FIG. 19 is a partial elevational view of the spacer portion of FIG. 18; and

FIG. 20 is a partial exploded perspective view of a spring and adjacent ferrules, according to the present invention.

DETAILED DESCRIPTION OF THE PREFERRED EMBODIMENT

The spring-and-spacer assembly of the present invention is provided for use in connection with a fuel assembly, such as that depicted in FIG. 1. The fuel assembly 20 includes a plurality of fuel elements or rods 21, supported between an upper tie plate 22 and a lower tie plate 23. The fuel rods 21 pass through a plurality of fuel rod spacers 24a, 24b, which provide intermediate support to retain the elongated rods 21 in spaced relation and to restrain them from lateral vibration. In one embodiment, seven spacers are longitudinally evenly spaced along the fuel assembly.

Each of the fuel rods 21 is formed of an elongated tubular cladding material containing fissile fuel and other materials, such as burnable nuclear poison, inert material, or the like. The fuel and other materials are sealed in the tube by upper and lower end plugs 26, 27. The lower end plugs 27 are registered and positioned in cavities 29 formed in the lower tie plate 23. Similarly, the upper end plugs 26 fit into cavities 31 in the upper tie plate 22.

Some of the fuel rods 21 may be provided with threaded lower and upper end plug extensions 27', 28'. The threaded lower end plugs screw into tapped holes in the lower tie plate. The threaded upper end plugs extend through the upper tie plate and receive retaining nuts 32. In this manner, the upper and lower tie plates and fuel rods are formed into a unitary structure.

Typically, the fuel rod assembly includes a flow channel 33 of substantially square cross-section sized to form a sliding fit over the upper and lower tie plates 22 and 23 and the spacers 24a and 24b, so that the channel 33 may readily be mounted and removed. The channel 33 is fastened to a post 36 of the upper tie plate 22 by means of a bolt 37 passing through a tab 34. The lower tie plate 23 includes a nose piece 38 adapted to support the fuel assembly 20 in a socket in a core support plate (not shown) in the reactor pressure vessel. The end of the nose piece is formed with openings 39 to receive the pressurized coolant so that it can flow upwardly among the fuel rods.

One or more of the fuel rods 21 may be replaced by a moderator tube 41 which contains a neutron moderator. The moderator tube 41 may be apertured, as shown at 42 and 43, and the upper and lower end plugs may be formed with passages 44, 46 to permit flow of water moderator therethrough.

An understanding of the present invention is promoted by a brief description of the spacer and spring apparatus of previous devices. A prior art spacer 24, as depicted in FIGS. 2 and 3, is made up of a plurality of substantially cylindrical ferrules 51 joined to one another, for example by welding, at the upper and lower edges of abutting portions of adjacent ferrules. Each of the ferrules 51 provides a space for a fuel rod 21 or moderator 41.

Preferably, each of the ferrules 51 is formed of a short section of tubing having circular cross-section. A peripheral band 56 surrounds and supports the plurality of ferrules 51. Two stops 62a, 62b are provided in each ferrule. Preferably, the stops 62a, 62b are formed integrally with each ferrule 51 as laterally spaced pairs of arched portions of the ferrule walls near the upper and lower edges of the ferrule.

Preferably, the stops 62a, 62b are laterally oriented to minimize spacer projected area and coolant-flow resistance. As best seen in FIG. 3, each pair of ferrules 51 shares a continuous loop spring 70. As depicted in FIG. 4, the continuous loop spring 70, used in previous devices, includes first, second, third, and fourth legs 72a, 72b, 72c, 72d joined by mid-positioned ridges 74a, 74b and end-positioned arches 76a, 76b. The springs 70, depicted in FIG. 3, are in their substantially unstressed or unflexed condition. The springs in the flexed or stressed condition are depicted in FIGS. 5 and 6. In the previous devices, depicted in FIGS. 5 and 6, the springs 70 occupy the region 78 of rod-to-rod spacing. In previous devices, the rod-to-rod spacing 78 was approximately 0.125 to 0.16 inches (about 3 mm to about 4 mm).

As seen in FIG. 6, the previous spring 70 contacted the fuel rods 82a, 82b at the ridge portion 74a, 74b, and provided a force tending to position the fuel rods 82a, 82b against the stops 62a, 62b of each ferrule. Each ferrule 51 was provided with a C-shaped slot 84, defining a tab 86 (See FIG. 7). In assembly, the spring 70 was inserted into the slot 84 and positioned over the tab 86. An adjacent ferrule was fitted to the initial ferrule, with the C-shaped slot of the second ferrule oriented with the tab 86 pointing in the opposite direction from the tab of the first ferrule. The tabs 86 of the first and second ferrules overlapped each other. The spring was then captured between the two ferrules, and formed a loop around the tabs 86.

A number of difficulties have been noted in connection with the previous spring-and-spacer assembly, particularly when such assembly is intended for use in connection with a fuel assembly having a reduced rod-to-rod spacing. The spring which is used in a spring-and-spacer assembly must provide the required amount of force, preferably about 2.5 pounds (about 1 kg), but must also have sufficient flexibility to tolerate deflection beyond that normally needed for fuel positioning without substantially permanent deformation. Deflection of the spring beyond that normally needed for positioning the fuel rod can occur, for example, during assembly, particularly if the fuel rod 82 is encased, during assembly, in a protective plastic sheath (not shown).

Because a single spring 70 of the previous device was provided for each pair of ferrules 51, special arrangements had to be made for fuel assemblies having an odd number of fuel rods 82.

FIGS. 9 and 10 depict a portion of a spacer and the associated springs according to the present invention. A spring 92a is formed of a metallic strip having a width 94 (FIG. 16) and a thickness 96 (FIG. 15). The spring can be formed of a number of materials having suitable strength, corrosion resistance, and resilience characteristics. In one preferred embodiment, the spring is formed of a nickel alloy, such as Inconel~, available from Huntington Alloy Products Division, International Nickel, Inc., Huntington, W.Va. In the preferred embodiment, the width 94 is about 0.1 to 0.15 inches (about 2.5 to 3.8 mm), and the thickness 96 is about 0.01 to 0.015 inches (about 0.25 to 0.38 mm). The ribbon has first and second ends 102, 104 which are spaced apart. The strip is formed into a spring having a leg portion 106. The leg portion 106 includes a rod-contacting arched portion 108, at the center of which is a rod-contacting point 110. Although an arch-shaped contact region 108 is a preferred method of forming a contact point 110, a contact point can also be formed by means of a cone-shaped dimple formed in the ribbon, a ridge, button, or other extension formed in or attached to the ribbon, or other similar expedients. The portions 112, 114 of the leg 106 on either side of the rod-contacting portion 108 are substantially flat.

First and second loops 116, 118 are formed adjacent to the first and second ends 102, 104, positioned at each end of the leg 106. Preferably, the loops 116, 118 are formed by bending the ends of the ribbon to form a hairpin turn, and welding the ends 102, 104 where they contact the ribbon.

FIG. 15 depicts a slightly modified configuration of the spring in which the strip passes on the near side of the ear, and then extends over the ear and down the far side of the ear, where it is welded. Only the upper half of the symmetrical spring is shown. Each loop 116 has a dimple 122 respectively, formed therein in the shape of a trough-like indentation extending toward the interior of the loops 116. The interior surfaces of the dimples 122 form points or lines of contact 126 with ears 132 formed in the ferrule as described more fully below. Although trough-shaped dimples 122, 124 are the preferred devices for providing contact with the ears 132, 134, contact can also be provided by, a cone-shaped dimple (forming a contact point), a ridge or button formed or attached to the interior surface of the loops 116, 118, or similar expedients.

As depicted in FIG. 16, in one embodiment of the invention, the width 94 of the spring is the same in all portions of the spring. In another embodiment depicted in FIG. 17, the width 142 near the end portions, such as in the loop portions 116, 118, is less than the width 144 in the leg portion 106 of the spring. It is possible to provide a narrower or tapered region, as depicted in FIG. 17, at one or both ends of the spring because, as discussed more thoroughly below, stresses on the spring in the end portion 116 of the present invention (compared to stresses in other portions) are less than stresses of corresponding portions in previous designs. Because the stresses are reduced, less massive, i.e., narrower, structures can be used. By providing a narrowed or tapered width 142, a spring which has a lessened overall mass, as compared to the constant-width spring of FIG. 16, is possible. A spring having a lessened mass provides for a lower amount of neutron absorption, which is related to the mass of the spring. By reducing neutron capture, the deleterious effect of capturing neutrons (which can be otherwise used to sustain the nuclear reaction) is reduced. Furthermore, a spring with a tapered end portion, as depicted in FIG. 17, presents a smaller surface area in the end portion than the surface area presented by a constant-width spring, such as that depicted in FIG. 16. Such a smaller-surface area spring provides a decreased amount of flow resistance or blockage which is related to the surface area of an obstruction.

The spring of the present invention is used in connection with a spacer comprising a number of ferrules 136 (FIGS. 11-13). The spacer can be formed of a number of materials having a suitably low neutron absorption cross-section, preferably a zirconium alloy, such as Zircaloy-4-~. The spacer in one embodiment is about 5.25 inches (about 13.3 cm) square, and the ferrules are about 0.64 inches (about 16.2 mm) in outside diameter with a wall thickness of about 0.020 inches (about 0.5 mm).

Referring to FIGS. 11-14 the ferrule of the preferred embodiment includes two upper stops 146, 148 and two lower stops 152, 154 extending inwardly into the ferrule 136. Preferably, the stops 146, 148, 152, 154 are formed by indenting portions of the ferrule wall to produce inwardly-arching structures. As best seen in FIG. 9, the fuel rods 82a, 82b, 82c are abutted against the stops 146, 148, 152, 154 to place the fuel rods 82a, 82b, 82c in a preferred position within the ferrule 136, such as a position coaxial with the ferrule. The force to maintain the fuel rods 82a, 82 b, 82c in contact with the stops 146, 148, 152, 154 is provided by the spring 92a, 92b, 92c. In order to provide such force, the spring 92a is mounted on ears 132, 134 of the ferrule 136 (See FIG. 12). The ears 132, 134 are defined by an E-shaped slot 158 formed in the wall of the ferrule 136. The upper and lower legs 162, 164 of the E-shaped slot 158 are connected to narrow slots 166, 168. The region between the upper leg and slot and hole 162, 166 and the lower leg, and slot 164, 168 is generally in the form of a tab 176. The middle leg 178 of the E-shaped slot 158 serves to define the ears 132, 134. As seen in FIGS. 11 and 14, the tab 176 is curved outwardly from the circumference of the ferrule 136. As seen in FIG. 20, the spring 92a is attached to the ferrule 136 by slipping the upper and lower loops 116, 118 over the upper and lower ears 132, 134.

The spring is retained in its position on the ears by engagement with a rectangular slot 178, formed in an adjacent ferrule 182. As seen in FIG. 20, after the adjacent ferrule 182 is attached to the first ferrule 136 the rectangular slot 178 of the adjacent ferrule 182 will prevent movement of the spring 92a off of the ears 132, 134. Preferably, each ferrule 134 contains both an E- shaped slot and, on substantially the opposite surface, a rectangular slot 178, as depicted in FIGS. 12—14.

According to the depicted preferred spring-and spacer assembly, the spring 92a contacts the ferrule 136 at two points, i.e., the upper and lower ears 132, 134 (FIG. 10). By providing upper and lower loops 116, 118, which are continuous with the spring leg 106 for connection with the ears 132, 134, a single break in any portion of the spring will not permit the spring or any portion of the spring to become disengaged from the ferrule 136.

The effective length 192 of the spring 92a is the distance between the contact points 126, 124. Because the spring 92a contacts the ears 132, 134 at points defined by the dimples 122, 124, the effective length of the spring 192 is not readily affected by small deformations of the spring, accumulation of corrosion products, and the like. Thus, accordingly to the present invention, the effective length of the spring 92a is invariable. In the preferred embodiment, the effective spring length 192 is about 0.8 inches (about 20 mm).

In addition to providing for a stable and definable length 192, the dimples 122, 124 act to promote the flexibility of the spring 92a, as compared to previous spring designs. As noted above, previous spring designs, in considering the portion loading a single fuel rod, act effectively as a constrained beam. As best shown in FIG. 15, the spring of the present invention acts as a simply supported beam. When the spring 92a is stressed, and the leg 106 moves in a direction away from the preferred-position fuel rod, it rotates about the ear contact point 126, as shown, in exaggerated form, by the phantom lines in FIG. 15. The increased flexibility of the spring of the present invention has been confirmed by computer modeling of stress and movement using a finite element technique.

The increased flexibility (i.e., deflection at a given load) of the spring of the present invention, in addition to being useful for permitting smaller rod-to-rod spacing, is also useful in connection with an assembly technique used to avoid scratching the fuel rods. It is desired to avoid scratching the fuel rods because such scratching can conceivably contribute to crack initiation or propagation, and can detract from the appearance of the fuel assembly. According to the scratch-free assembly technique, the fuel rods, before insertion into the assembly, are encased in a plastic sheath. After the encased fuel rod is positioned as desired, the sheath is removed. Typically, the sheath has a thickness of about 0.004 inches (about 0.1 mm). The additional spring deflection (during assembly) caused by the thickness of the sheath must be accommodated by the spring without permanent deformation thereof. The spring of the present invention contains sufficient flexibility to avoid permanent deformation during scratch-free assembly, even with a lessened rod-to-rod spacing available for holding the spring.

The spring of the present invention can be provided in connection with other types of spacers than that depicted in FIGS. 9-17. In one alternative spacer configuration, depicted in FIGS. 18 and 19, helically-twisted "swirl vanes" 237a, 237b, 237c, 237d are positioned around the periphery of a fuel rod 282, such as at four equally spaced positions on the perimeter of the fuel rod 282. Arms 239 connect the swirl vanes to each other to define a rectangular matrix for holding the fuel rods 282. A spring 293 includes two end loops 216, 218 attached to two of the arms 239. The spring 293 includes an arched rod contact portion 208 similar to the rod contact portion depicted above in connection with FIG. 10. Edges of the swirl vanes 237a, 237b, 237c, 237d are provided with protrusions 246, which act as stops for positioning the fuel rod 282. The upper and lower loops 216, 218 of the spring 293 contain dimples (not shown) similar to those depicted and described above in connection with the embodiment depicted in FIGS. 9 and 10, for contacting the arms 293b, 293a.

In light of the above description, a number of advantages of the present invention are apparent. The spring can be provided in a smaller space, such as that available with the rod-to-rod spacing of only about 0.1 inches (about 2.5 mm), and yet be provided with the required force for fuel-rod loading of about one pound, preferably about 2.5 pounds (about 1 kg). The present spring is more flexible, and tends to rotate under stress in the manner of a simply supported beam, as opposed to having an endpoint fixed in the manner of a constrained beam. The effective length of the spring is a predeterminable, known, and relatively stable quantity. Since less strain is produced at the end portion of the spring, the end portion can be tapered or narrowed to provide for a lessened neutron absorption and a lessened flow obstruction. Certain configurations provide increased rod-to-spring spacing to provide for better coolant flow near the rod. By avoiding the need for using a single spring to load two fuel rods, there is no need to provide special configurations for spacers with an odd number of fuel rods. The increased flexibility of the spring permits the use of scratch-free assembly, even in configurations having small rod-to-rod spacing. The spring-and-spacer assembly provides for ease of construction, and the spring of the present invention is adaptable to a number of different spacer types. The spring of the present invention will not break free from its connection to the spacer as a result of a single, simple break in the spring.

A number of variations and modifications of the present invention will be apparent to those skilled in the art. The spring and/or spacer can be made of materials other than those discussed herein. The general spring and spring-and-spacer assembly configuration can be used in connection with spacers having more or fewer fuel rod positions than those depicted herein, and can be used with configurations having components other than fuel rods passing therethrough, including tie rods, water (moderator) rods, and the like. The spring of the present invention can be attached to a spacer by means other than the ferrule slot depicted, such as by attachment using slots of other shapes. The spring can be retained on the ferrule by means other than an engaging slot in an adjacent ferrule, such as by bending the tab ears, interlocking resilient tabs and slots, and the like. Various aspects of the disclosed design can be used independently of other aspects, for example, a spring can be provided with an end loop but without a dimple.

Although the description of the present invention has included a description of a preferred embodiment and various modifications thereof, other modifications and variations will be apparent to those skilled in the art, the present invention being described in the following claims.

What is claimed is:

1. A spring for positioning at least one of a plurality or nuclear fuel rods in a spacer usable in a fuel assembly of a nuclear power plant, the spacer provided with a plurality of ferrules, each ferrule having rod-contacting portions for holding at least one of said rods when said rod is biased against said rod-contacting portions by the spring, the spring comprising:
 a metallic strip having a width and a thickness, and having first and second ends, said ends spaced apart, said strip formed to include:
 a central region having a rod-contacting portion;
 a first spacer-engagement loop formed adjacent to said first end;
 a first dimple formed in said first loop, extending towards the interior of said first loop;
 a second spacer-engagement loop formed adjacent to said second end;
 a second dimple formed in said second loop, extending towards the interior of said second loop; and
 a first leg lying between the central rod contacting portion and the first loop; and
 a second leg lying between the central rod contacting portion and the second loop.

2. A spring as claimed in claim 1, wherein the width of said spring varies along the length of said spring.

3. A spring, as claimed in claim 1, wherein said rod-contacting portion includes an arch formed in said rod-contacting portion, and wherein the portion of the spring between said rod-contacting portion and said first and second legs is substantially flat.

4. A spring and spacer assembly for positioning at least one of a plurality of nuclear fuel rods, usable in a fuel assembly of a nuclear power plant, comprising:
 a plurality of ferrules joined to each other, each ferrule having at least one rod stop for contacting at least one of said rods when said rod is in a preferred rod position biased against said rod stop, at least a first ferrule having a first slot defining an ear portion;
 at least a first spring for biasing a fuel rod towards said rod stop, said spring having a width and a thickness, and having first and second ends, said ends spaced apart, said spring formed to include:
 a central region having a rod-contacting portion;
 first and second loops for engaging said ear portion of said first ferrule, said first and second loops having first and second dimples, respectively, for contacting said ear portion;
 first and second legs lying between the central region and the first and second loops.

5. An assembly, as claimed in claim 4, wherein at least a portion of said spring rotates about said contact between said first dimple and said ear portion upon flexing of said spring.

6. An assembly, as claimed in claim 4, wherein said length of said spring between said first and second dimples is about 0.8 inches.

7. An assembly, as claimed in claim 4, wherein said rod-contacting portion includes a ridge formed in said central region and wherein the said first and second legs are substantially flat.

8. An assembly, as claimed in claim 4, wherein said spring has a variable width along the length of said spring; the width being greatest in said central portion of spring, and being reduced in other portions of the spring.

9. An assembly, as claimed in claim 4, wherein the rod-to-rod spacing defined by said spacer is less than about 0.11 inch.

10. An assembly, as claimed in claim 4, wherein said spring provides a force to said rod of at least about one pound.

11. An assembly, as claimed in claim 4, wherein the rod-to-rod spacing of rod positions defined by said spacer is less than about 0.11 inch.

12. A spring and spacer assembly for positioning at least one of a plurality of nuclear fuel rods, usable in a core assembly of a nuclear power plant, comprising:
 a plurality of ferrules joined to each other, each ferrule having rod stops for contacting at least one of said rods when said rod is in a preferred rod position biased against said rod stops, at least a first ferrule having a first slot defining two ear portions;
 a spring for biasing a fuel rod toward said rod stop, said spring having a width and a thickness, and having first and second ends, said ends spaced apart, said spring formed to include:
 at least a first leg having a rod-contacting portion; and
 first and second loops for engaging said ear portions of said first ferrule, said width is greatest in the central portion of said leg, and is reduced in other portions of the spring, to reduce neutron-capture by said spring.

13. An assembly, as claimed in claim 12, wherein said first and second loops each include a region for contacting said ears, and wherein said first and second loops each rotate about said regions upon flexing of said spring.

14. An assembly, as claimed in claim 12, wherein said plurality of ferrules define a plurality of preferred rod positions having a rod-to-rod spacing of less than about 0.11 inch.

15. A spring and spacer assembly for positioning at least one of a plurality of nuclear fuel rods, usable in a core assembly of a nuclear power plant, comprising:
 a plurality of ferrules joined to one another, at least a first ferrule having a first slot defining two ear portions, at least a second ferrule having a second slot substantially without an ear portion, said second slot having a width;
 at least a first spring for biasing a fuel rod towards said rod stops, said spring having a width and a thickness, said width being less than the width of said second ferrule slot, said spring having first and second ends, said ends spaced apart, said spring formed to include:
 at least a first leg having a rod-contacting portion; and
 first and second loops for engaging said ear portions of said first ferrule;
 said second ferrule attached to said first ferrule in a position with said second slot aligned with said first slot so as to prevent disengagement of said spring from said ears.

16. An assembly, as claimed in claim 15, wherein at least one of said first and second loops includes a region for contacting said ear, and wherein said first and second loops each rotate about said regions upon flexing said spring.

17. An assembly, as claimed in claim 15, and wherein said spring has a variable width along the length of said spring, the width being greatest in said central portion of said spring and being reduced in other portions of said spring.

18. An assembly, as claimed in claim 15, wherein said plurality of ferrules define a plurality of preferred rod positions having a rod-to-rod spacing of less than about 0.11 inch.

19. A spring for positioning at least one of a plurality of nuclear fuel rods in a spacer usable in a core assembly of a nuclear power plant, the spacer defining a plurality of rod positions. the spring comprising:

a metallic ribbon having a width and a thickness and having first and second ends, said ends spaced apart, said ribbon formed to include:

at least a first leg having a rod-contacting portion;

a first spacer-engagement loop formed adjacent to said first end;

at least a portion of said leg extending adjacent to said first loop;

said rod-contacting portion including an arch formed in said leg, wherein the portion of the spring between said rod-contacting portion and said first loop is substantially flat.

20. A spring, as claimed in claim 19, wherein said first spacer-engagement loop includes a ridge for contacting an adjacent fuel rod.

* * * * *